United States Patent [19]

Sheffer

[11] Patent Number: 4,992,743
[45] Date of Patent: Feb. 12, 1991

[54] DUAL-TONE DIRECT DIGITAL SYNTHESIZER

[75] Inventor: Tzafrir Sheffer, Seattle, Wash.
[73] Assignee: John Fluke Mfg. Co., Inc., Everett, Wash.
[21] Appl. No.: 436,634
[22] Filed: Nov. 15, 1989
[51] Int. Cl.$^5$ .................... H03C 1/50; H03B 19/00
[52] U.S. Cl. .................... 328/14; 307/529; 332/149; 364/718
[58] Field of Search ............ 332/31 R; 328/14; 364/718; 307/529

[56] References Cited

U.S. PATENT DOCUMENTS

| | | | |
|---|---|---|---|
| 3,735,269 | 5/1973 | Jackson | 328/14 |
| 3,824,483 | 7/1974 | Margala et al. | 331/1 A |
| 3,882,403 | 5/1975 | Gerken | 328/14 |
| 3,949,304 | 4/1976 | McClaskey | 325/421 |
| 3,949,305 | 4/1976 | McClaskey et al. | 325/421 |
| 4,134,072 | 1/1979 | Bolger | 328/14 |
| 4,144,579 | 3/1979 | Nossen et al. | 364/607 |
| 4,240,034 | 12/1980 | Lowenschuss | 328/14 |
| 4,331,941 | 2/1980 | Kovalick | 332/31 R |
| 4,380,743 | 4/1983 | Underhill et al. | 331/1 A |
| 4,563,657 | 1/1986 | Qureshi et al. | 331/25 |
| 4,745,371 | 5/1988 | Haine | 331/1 A |
| 4,752,902 | 6/1988 | Goldberg | 364/721 |

OTHER PUBLICATIONS

Fred H. Ives, "Multifunction Synthesizer for Building Complex Waveforms", Feb. 1989, Hewlett-Packard Journal, pp. 52-57.
Mark D. Talbot, "Digital Waveform Synthesis IC Architecture", Feb. 1989, Hewlett-Packard Journal, pp. 57-62.
Heikes et al., "Development of a Digital Waveform Synthesis Integrated Circuit", Feb. 1989, Hewlett-Packard Journal, pp. 62-65.
Thomas M. Higgins, Jr., "Analog Output System Design for a Multifunction Synthesizer", Feb. 1989, Hewlett-Packard Journal, Jr., pp. 66-69.
Mark D. Talbot, "Firmware Design for a Multiple-Mode Instrument", Feb. 1989, Hewlett-Packard Journal, pp. 70-73.
Kenneth S. Thompson, "Multifunction Synthesizer Applications", Feb. 1989, Hewlett-Packard Journal, pp. 73-76.
Schwartz et al., "Testing and Process Monitoring for a Multifunction Synthesizer", Feb. 1989, Hewlett-Packard Journal, pp. 77-79.
Eisenson, "Digital Techniques Hatch High-Speed Direct Synthesizer", pp. 165-170.
Kovalick et al., "Arbitrary Waveform Synthesizer Applications in Magnetic Recording and Radar", pp. 86-93.
Sagun et al., "A 125-MHz 12-Bit Digital-to-Analog Converter System", pp. 78-85.

Primary Examiner—Stanley D. Miller
Attorney, Agent, or Firm—Stephen A. Becker; George T. Noe

[57] ABSTRACT

Arrangements are provided for generation of dual-tone waveforms utilizing direct digital waveform synthesis techniques and architecture and retaining the advantageous characteristics of direct digital waveform synthesis. Preferred embodiments feature combination of generated waveforms at an analog adder, a digital adder using a single digital-to-analog converter and at a single wave table, respectively, each providing particular hardware economies and operational advantages with respect to other preferred embodiments.

8 Claims, 3 Drawing Sheets

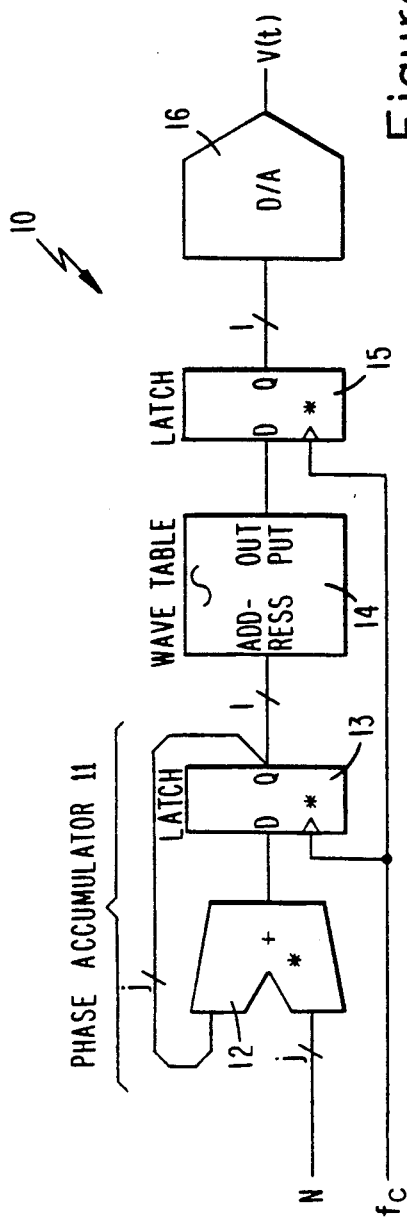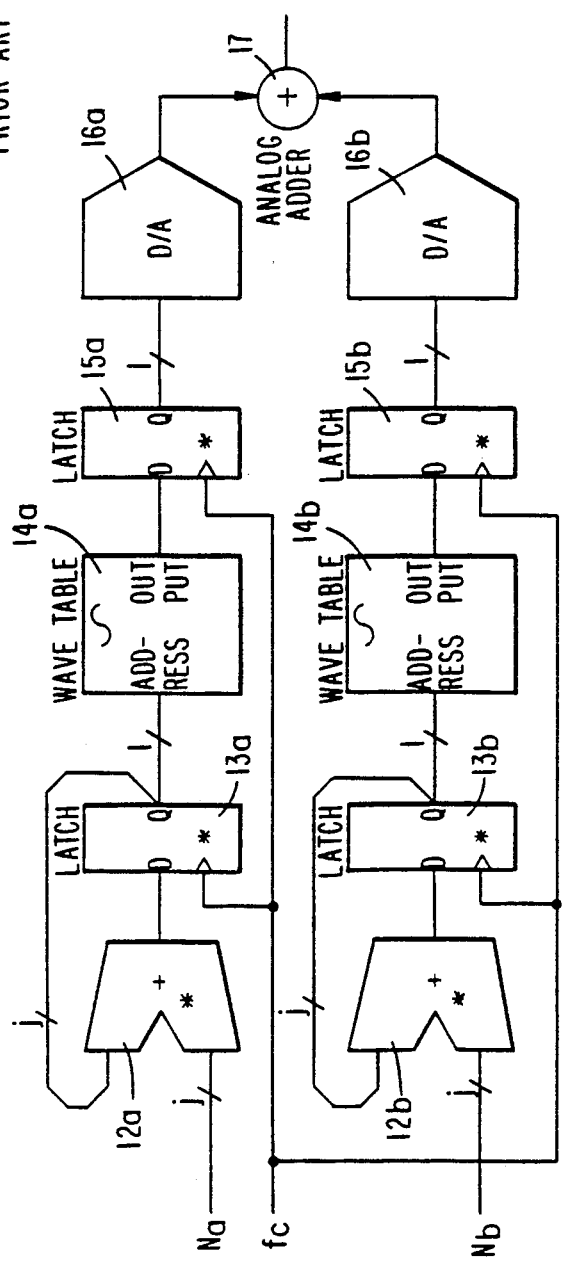

DUAL-TONE DIRECT DIGITAL SYNTHESIZER

FIELD OF THE INVENTION

This invention is related to digital waveform generators. More specifically, this invention is directed to high precision digital waveform generators capable of generating waveforms constituting the superposition of multiple periodic signals of equal amplitudes and of different frequencies.

BACKGROUND OF THE INVENTION

In the testing of electrical equipment, it is often necessary to characterize non-linearities of devices and circuits. For this purpose, it is useful to have a high accuracy source of a waveform containing equal amplitude components of multiple frequencies. For this purpose, the term "dual-tone" signal has come to be accepted in the art as a waveform which has multiple (e.g. not limited to two) equal amplitude sinusoidal components of differing frequencies. However, it is not signifigant to the practice or the use of the invention that the convention of sinusoidal waveforms or equal amplitudes of the plural components be observed and the plural components can be relatively attenuated or initially generated at any amplitude or with any desired waveshape. Therefore, a "dual-tone signal" merely connotes a signal having components comprising at least two waveforms. It is in this sense that the term "dual-tone" will be used throughout the following detailed disclosure of the invention to refer to both the signal and the apparatus for producing the same.

Numerous techniques of generation of waveforms containing plural frequency components have been used in the past with varying degrees of waveform accuracy and ease of use. For instance, analog waveform generation has often been used in the past, but is subject to drift, both in frequency and amplitude. The accuracy obtainable through analog waveform generation is simply not adequate for testing of modern electronic devices. The difficulty of developing arbitrary waveforms with oscillators used by analog waveform generators is also substantial.

Also among known techniques is the record/playback method which is of use where the circuit is required to handle a specific waveform in a predetermined way. However, this technique permits virtually no flexibility in waveform or frequency change without repeating the recording process. Digital recording techniques have allowed the record/playback technique of waveform generation to remain a viable waveform generation method for certain, extremely limited, applications in testing modern electronic devices. However, limitations are imposed by the periodicity of the recording medium, such as an optical disc.

Another method which can be digitally implemented and provides relatively high precision while permitting generation of waveforms which are arbitrary is that of computation of a waveform based on the use of a single fundamental pulse waveform. Typically, this fundamental waveform is obtained from an isolated read head transition, with respect to a given recording medium, which is then filtered and subjected to automatic gain control and thereafter used as a basic building block of any desired waveform. While this technique yields high flexibility and amplitude, phase and frequency resolution, it also requires a substantial computational load and produces only a single, though potentially complex, waveform. It is, therefore, less suitable for a test instrument since it requires each stand-alone instrument to possess such computational power. Further, in such an arrangement, transient-free switching from one waveform to another is not easily accomplished. Coherent generation of plural frequency components is also difficult and settling time is extended.

Therefore, for test instruments, direct digital waveform synthesis and synthesizers using this technique, both hereinafter sometimes referred to as "DDS", are most often employed. Digital waveform synthesizers are well known and are of widespread use in test equipment and as reference waveform sources. In modern communication and other electronic equipment, it has been necessary to develop such synthesizers which are capable of producing waveforms over a wide range of frequencies, typically 0.1 Hz to several MHz, and of high frequency resolution, typically 0.01 Hz. Since it is common in the art to specify a desired frequency as a decimal number, it has become almost a standard in the industry to use a decimally related reference frequency source, typically 10 MHz (for which high accuracy oscillators are readily available), for direct digital synthesizers. Also because of this convention, it is common to use a binary coded decimal (BCD) adder to accumulate the phase of the synthesized signal to produce the desired frequency from the reference frequency. The arrangement disclosed in U.S. Pat. No. 3,735,269 by Jackson is typical of such arrangements.

A block diagram of a common configuration DDS 10 is shown in FIG. 1. This block diagram is typical of either a decimal or binary DDS. The DDS has, as its first stage, a phase accumulator 11, a possible configuration for which comprises an adder 12 which has both clock and phase increment inputs and a latch 13, which receives inputs from a reference clock signal source, $f_c$, and another means such as a switch or a register, which specifies the integer phase increment, N. This phase accumulator is typically an accumulating adder or counter or other means for generating a numeric sequence representing phase presettable to an arbitrary number N which generates addresses which are then applied to a phase to amplitude mapping or conversion device 14, such as a wave table, waveform memory or look up table, to obtain amplitude values for the waveform at instantaneous phase locations. Alternatively, other arrangements such as mapping or logic devices or any device capable of performing phase to amplitude conversion or mapping can be used. The output of the memory is latched at 15 in synchronism with the input reference frequency and applied to a digital-to-analog converter 16. The output of the D/A converter is then filtered to remove spurious (e.g. anti-aliasing, sampling noise, etc.) frequency components higher than the Nyquist frequency and, thus, produce the desired waveform at the desired frequency. Operation of this filter is not germane to an understanding of the invention and it is, therefore, not illustrated or further discussed. This arrangement is well understood in the art and further detailed disclosure is not deemed necessary. A review of the operation of such devices and a detailed disclosure of a decimally-operating DDS, implemented with binary hardware, is provided in U.S. application Ser. No. 07/325,359, filed Mar. 17, 1989, entitled Coherent Direct Digital Synthesizer, by the inventor herein and commonly assigned, which is hereby incorporated by reference herein.

As pointed out above, dual-tone sinusoidal signals are commonly used to characterize non-linearities of electronic circuits. For instance, whether the modulation is desired or parasitic, the cross-modulation product of a circuit could be analyzed by application of a dual-tone signal (in this case, containing two sinusoidal components at different frequencies). Amplifiers, adders and modulators as well as many other types of circuit can be analyzed or tested by exciting their inputs with a dual-tone signal and measuring the harmonics in order to characterize the non-linearity of the device.

SUMMARY OF THE INVENTION

Generation of such dual-tone signals is possible with the DDS arrangement of FIG. 1, simply by loading the wave table with an amplitude sequence of the two superimposed waves. The recognized advantages of using DDS, specifically, high frequency stability and accuracy, exceptional frequency and amplitude resolution, convenient numerical control and an economical structure are all maintained. Frequency may be conveniently changed by alteration of the phase increment, N, or by changing the clock frequency $f_c$. However, production of dual-tone signals, consistent with low spur levels (e.g. the power or amplitude of transients or other spurious artifacts in the waveform) imposes the restriction that the ratio of the frequencies of the stored tones must be a rational number. For example, in the audio frequency combination of 800 Hz and 1800 Hz, which is a commonly used combination, the frequencies are in the ratio of 4:9, making this generation method a good choice for the production of such a dual-tone waveform. In this case, for example, the wave table would contain a vectored sum of four cycles of the 800 Hz signal and nine cycles of the 1800 Hz frequency and the DDS, itself, would be set to 200 Hz (800 (Hz) /4 (cycles)) to produce a waveform containing these exact frequencies.

Despite the simplicity and economy of this approach, the constraint of rationally related frequencies is too restrictive for most applications.

As pointed out above with respect to FIG. 1, the basic architecture of a DDS is only capable of producing a dual-tone waveform with low spur levels where the fundamental frequencies of each of the tones are a ratio of whole numbers. As a practical matter, this must also be a ratio of relatively small whole numbers to avoid the necessity of a wave table which is impractically large. This invention is directed to overcoming these constraints by the provision of plural phase accumulators which can be accomplished in a number of ways.

Therefore, it is an object of this invention to provide a dual-tone waveform generator having simplicity, economy and accuracy comparable to DDS waveform generators in which the frequencies can be independently varied.

It is another object of the invention to provide a dual-tone waveform generator using direct digital synthesis in which the waveforms may be readily altered.

It is a further object of this invention to provide a dual-tone waveform generator which is free of computational requirements in the production of complex waveforms.

It is yet another object of this invention to provide a method of generating plural independent frequencies in a direct digital synthesizer and by the direct digital synthesis technique.

It is another further object of the invention to provide an apparatus and method in which the phase to amplitude conversion required in direct digital synthesis is of reduced size and complexity and made independent of the relationship between the frequency components of the desired output waveform.

The above and other objects are satisfied, in accordance with the invention, by a dual-tone DDS having at least first and second waveform generator circuits, at least one of which comprises at least one phase accumulator, receiving a clock signal and a phase increment signal, for producing a sequence of phase information signals, at least one phase to amplitude conversion device and a device for combining a further signal with the output of a phase to amplitude conversion device.

In accordance with one embodiment of the invention, a dual-tone DDS is provided having two or more phase accumulators which may be commonly or independently clocked. In such an embodiment, a plural-tone direct digital synthesizer is provided having at least first and second waveform generator circuits receiving at least one clock frequency input wherein all waveform generator circuits comprise a phase accumulator, a phase to amplitude converter, a digital to analog converter and an analog adder receiving the outputs of the waveform generator circuits and outputting a signal containing at least the spectral components contained in the waveform produced by the waveform generator circuits.

In accordance with another embodiment of the invention, a plural-tone direct digital synthesizer is provided having at least first and second waveform generators, each comprising a phase accumulator, a phase to amplitude converter, and a digital to analog converter and including an analog adder receiving the outputs of at least the first and second waveform generators and outputting a signal containing at least the spectral components contained in the waveforms produced by the first and second waveform generators.

In accordance with yet another embodiment of the invention, a plural-tone direct digital synthesizer is provided having at least first and second waveform generators, each receiving a clock frequency input wherein each of the first and second waveform generators comprises a phase accumulator, and a phase to amplitude converter, and including a digital adder for adding the outputs of the phase-to-amplitude converters and a digital to analog conversion device for outputting a signal containing at least the spectral components contained in the waveforms produced by the first and second waveform generators in response to the output of the digital adder.

In accordance with a yet further embodiment of the invention, a plural-tone digital waveform generator is provided having a controller receiving a clock frequency and connected to first and second phase accumulators, a multiplexer receiving the outputs of the first and second phase accumulators and outputting a respective output of one of the first and second phase accumulators in response to an output of the controller, a phase-to-amplitude converter receiving the output of the multiplexer and producing a digital output, a digital adder for adding the digital outputs and a digital-to-analog converter for outputting a signal containing at least the spectral components contained in the waveforms produced by the first and second waveform generators in response to the output of the digital adder.

In accordance with another aspect of the invention, a method for generating a waveform by direct digital synthesis which includes plural independent frequency components is provided by independent specification of phase increment, generating a plurality of phase information signals in response to at least one sequence of clock signals and in accordance with the independently specified phase increments.

In accordance with a further aspect of the invention an apparatus and method are provided wherein a phase to amplitude conversion apparatus may be maintained at a convenient size, regardless of the relationship of the desired frequency components of the generated waveform and dependent only upon the desired phase resolution of the output.

By the provision of plural, independent phase accumulators in a direct digital synthesis waveform generator arrangement, permitting independent specification of phase increments of each desired frequency component to be generated, direct digital synthesis may be used to produce high quality waveforms containing a plurality of independently variable frequency components. Further, it is possible to control the phase relationship between the plurality of frequency components by various means such as varying one clock frequency for a predetermined period of time, omitting or interrupting clock pulses or adding a phase shift value to the output of a phase accumulator.

BRIEF DESCRIPTION OF DRAWINGS

FIG. 1 is a functional block diagram of a direct digital waveform synthesizer (DDS) capable of producing a dual-tone waveform.

FIG. 2 is a functional block diagram of a preferred embodiment of a DDS in accordance with the invention.

DETAILED DESCRIPTION OF THE INVENTION

Figure 3:
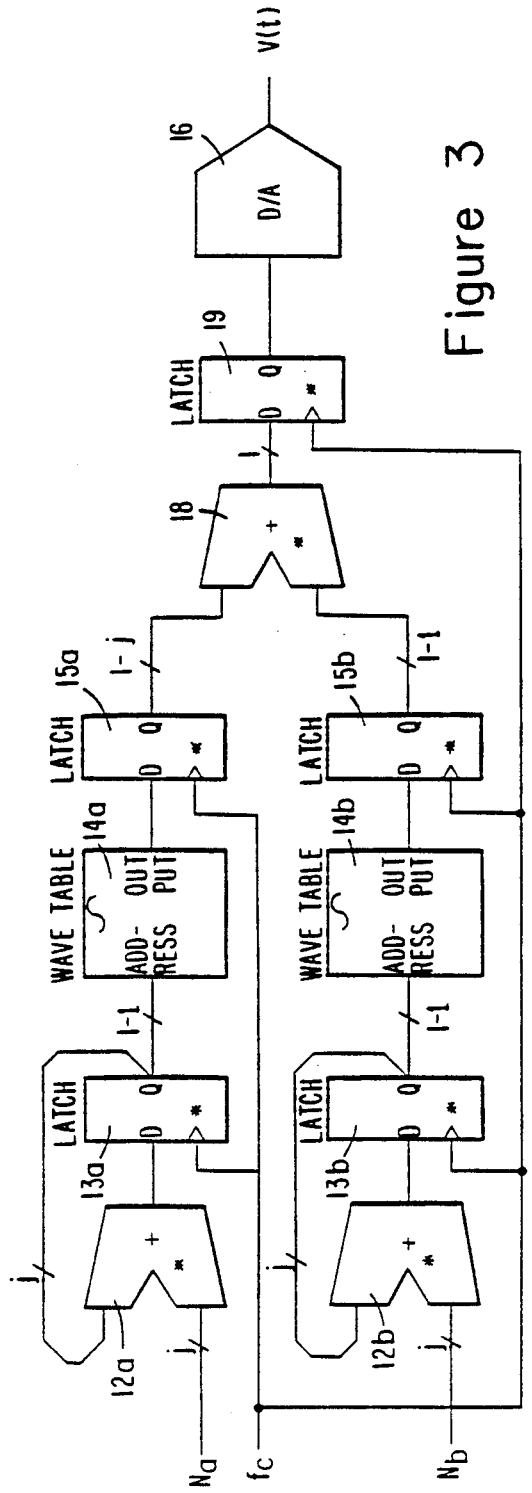
FIG. 3 is a functional block diagram of a second preferred embodiment of a DDS in accordance with the invention.

In consideration of the following preferred embodiments of the invention, it should be kept in mind that in commercial embodiments of any of the following preferred embodiments, it is contemplated that custom integrated circuits will be used which contain all elements of the system except above-noted anti-alaising filter and the digital to analog converter or converters. Both of these latter elements are currently available as commercial integrated circuits and, additionally, it is desireable that the highest speed, highest resolution digital to analog converters be used and that the unit be, accordingly, configured to accept upgrades of these digital to analog converters with minimal retrofitting modifications as higher performance circuits become available.

With reference to FIG. 2, a first preferred embodiment of the invention will be explained. This embodiment basically comprises a multiplication of the DDS arrangement of FIG. 1 with the outputs of the digital to analog converters combined by an analog adder. Each of the phase accumulators, which may, for example, consist of an adder 12a, 12b and a latch 13a, 13b has a phase increment input $N_a$, $N_b$ and a clock frequency input $f_c$. The phase accumulators may conveniently receive a common clock frequency fc input but this is not necessary for proper operation. The use of a common clock frequency allows phase coherence of the signals generated, regardless of frequency, and different clocks are not necessary to the provision of different and variable output frequencies since output frequency is also a function of $N_a$ and $N_b$. Therefore, independently controlled frequencies can be provided even with a common clock frequency to both phase accumulators. It should be understood that, while only two phase accumulators are shown, the basic arrangement of FIG. 2 is applicable to any number of waveform generators configured as shown in FIG. 1 with the outputs thereof combined by an analog adder 17. It should also be clear that should any of a plurality of frequencies desired to be generated also be related by the ratio of relatively small whole numbers, such plurality of frequencies can be produced by a single one or a smaller plurality of DDS branches of this embodiment.

It should also be noted that the use of plural branches with an independent phase accumulator in each branch preserves the full phase resolution of each branch, thus yielding an improvement of about 6 dB in the spur level (amplitude noise level) over other alternatives presented in alternative preferred embodiments of this invention. This improvement assumes only a single frequency produced by each branch for best phase resolution of each signal, but lesser improvements would accrue even if plural frequencies are produced in less than all branches. However, this gain is realized at the cost of the structure of the dual-tone generator being more than simply multiplied since an adder or summing circuit 17 is required in addition to full multiplication of the circuit of FIG. 1 including wave tables 14a, 14b, latches 15a, 15b and digital to analog converters 16a, 16b. Expense of a unit configured in this fashion is also not minimized because of the cost associated with a higher pin count of the custom integrated circuit which would be necessary which would be involved in a commercial implementation. Nevertheless, this arrangement is advantageous where a lower spur level is needed.

A second preferred embodiment which permits reduction of cost and functional elements compared to the embodiment of FIG. 2 is illustrated in FIG. 3 with elements common to previously described figures bearing similar reference numerals. In this embodiment, the outputs of the wave tables are combined digitally in a digital adder 18 and latch 19 similar to those used in the phase accumulators. This arrangement permits the use of only a single digital to analog converter 16. Since a state-of-the-art, high speed, high resolution digital to analog converter should be used in all of the preferred embodiments disclosed herein, the cost savings is not insubstantial. Further, the pin count of the custom integrated circuits necessary for the implementation of this embodiment is reduced to further reduce cost of constructing commercial units according to this preferred embodiment of the invention.

As with the first preferred embodiment, it should be understood that this embodiment is applicable to any number of branches and, since the reduction of digital to analog converters increases with the number of branches (since only one will be required in any case) economic savings and the importance of the advantage provided by this preferred embodiment will increase with the number of branches required for a given application.

It should also be understood that this embodiment represents a trade-off between low spur noise and the cost associated with plural digital to analog converters and high pin count custom integrated circuits. It should also be clear that, although the cost of memories, particularly on a cost per byte basis as compared to a cost per chip basis, is rapidly decreasing as a result of advances in static memory technologies, the hardware of this embodiment is not optimized because of the requirement of plural wave tables in this second preferred embodiment.

In a third, further, preferred embodiment according to the invention, the number of wave tables can be reduced to one. This embodiment, shown in FIG. 4 uses two (or more, in the manner indicated above) independent phase accumulators, which may or may not be commonly clocked as in the first and second preferred embodiments, both (or all) of which access a single wave table. Additionally, a lower pin count of the custom integrated circuits is obtained and printed circuit board size and assembly cost are significantly reduced. In this embodiment, it should be realized that a somewhat larger wave table memory may be required if different waveforms at each frequency are to be produced (but not if all frequencies are to produce a similar (e.g. sinusoidal) waveform) and the quantization errors, in time, are made irregular, resulting in a slightly degraded resolution of the output combined waveform. The required speed of the wave table is also multiplied with respect to other preferred embodiments disclosed herein by a factor equal to the number of independent phase accumulators contending for access. Therefore, a practical limit on the number of phase accumulators may be imposed by the access time of the memory and the intended maximum waveform frequency to be generated.

A controller section 20 is additionally required on the custom integrated circuit chip. While this controller is not, itself, particularly complex and many possible arrangements for providing the same will be apparent to those skilled in the art from the following detailed description of the operation of this embodiment, it should be realized that the complexity of the custom integrated circuit is significantly increased by the provision of the controller thereon.

According to the third preferred embodiment of the invention, the controller 20 receives a clock signal $f_c$ and produces timing signals which control the latches 13a, 13b of the phase accumulators of each respective branch in a common fashion. The controller also provides a switching signal to the multiplexer 21 such that only one access is presented at any given instant to the wave table 14. It is a primary function of the controller 20 that contention between branches is resolved at this point. At the output of the wave table 14, the controller controls latches 22a, 22b such that data from interleaved accesses to the wave table are concurrently presented to the digital adder. Each change in the input to the wave table corresponds to a different output value of the digital adder and the controller also provides control of a latch at the output thereof to causes storage of an updated output to the single digital to analog converter at each input change to the multiplexer.

Figure 4:
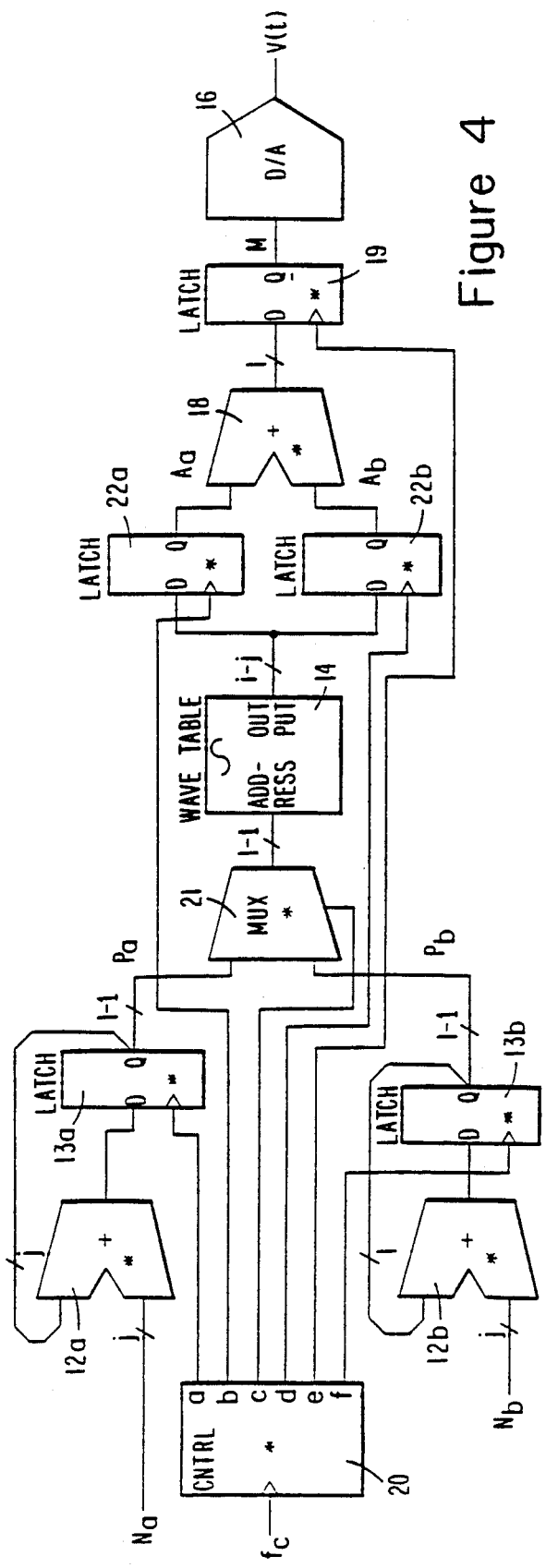
FIG. 4 is a functional block diagram of a third preferred embodiment in accordance with the invention.
Figure 5:
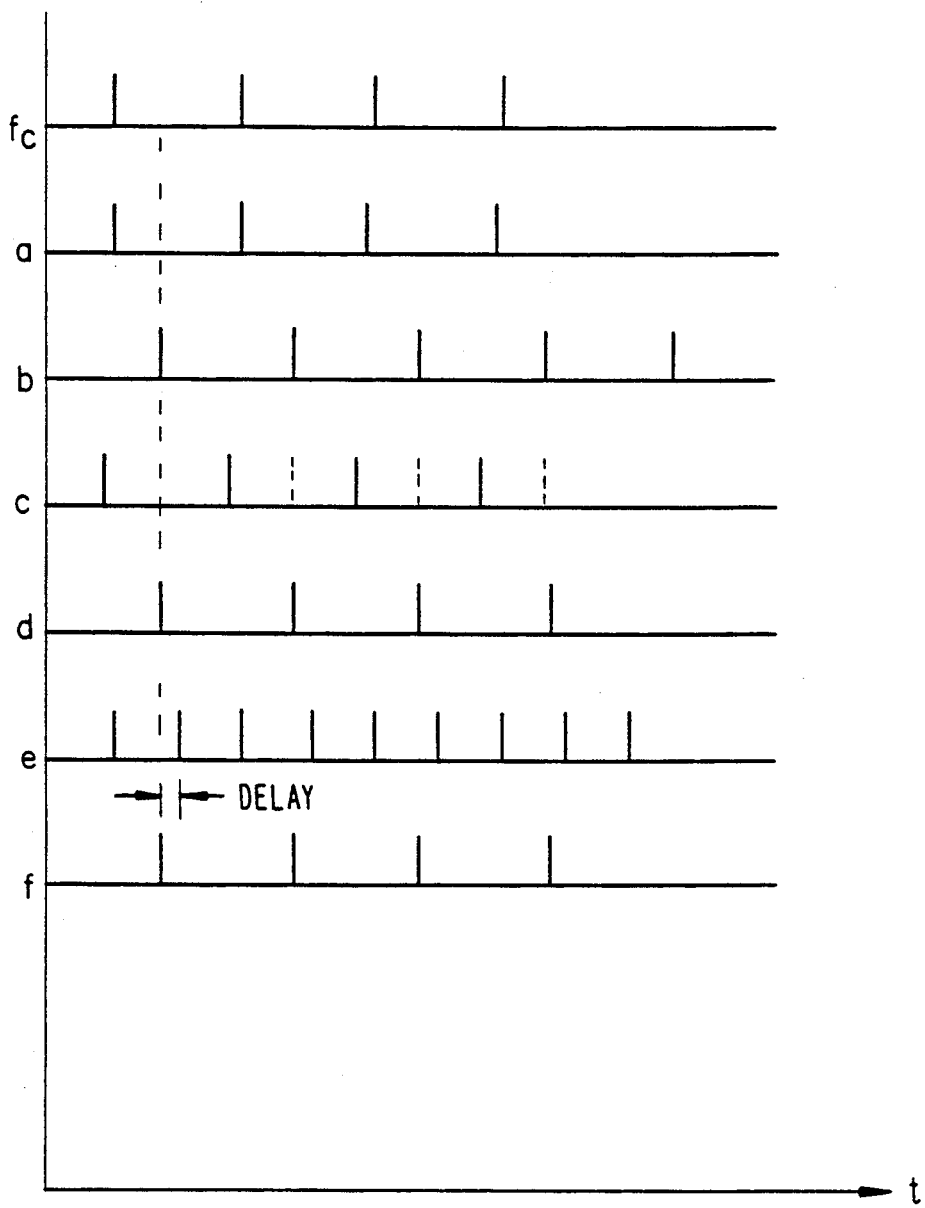
FIG. 5 is a timing diagram of the controller output in the preferred embodiment of FIG. 4.

Controller 20 is preferably responsive to clock signal $f_c$, as pointed out with respect to other embodiments of the invention but a larger numbers of controllers could be used, as well. The controller may be of any convenient structure and may resolve contention merely by providing different relative delays from clock signal $f_c$. A timing diagram of outputs of an exemplary embodiment of a controller relative to $f_c$ and suitable for use in the arrangement of FIG. 4 is illustrated in FIG. 5. In FIG. 5, outputs a is simply the clock signal $f_c$. Output f is delayed therefrom by one-half the clock period. Output c which controls the multiplexer 21 should be the same as either output a or output f, depending on the multiplexer response to the "1" or "0" state thereof so that the corresponding phase accumulator output will not be changed while the multiplexer output is connected thereto. Controller outputs b and d are connected to latches 22a and 22b, respectively and control these latches in a fashion to essentially provide a demultiplexing function on the output of the phase to amplitude converter 14. Since the conversion time (e.g. access time of the wave table) is finite, some delay must be accommodated. This delay may be performed by simply providing delay of signal a and f or even more simply by using signal a to control latch 22b and using signal f to control latch 22a, effectively providing a one-half clock cycle delay for phase to amplitude conversion. In practice, and since the latched signals will be immediately combined, it is irrelevant which latch receives the output corresponding a given phase accumulator. Latch 19 must be enabled at each change of data which change potentially occurs at every memory access. This occurs at twice the clock rate and an appropriate signal can be obtained by ORing signal a and f with, possibly, additional delay to accommodate signal propagation time through adder 18 or other suitable arrangement for combining the outputs of latches 22a and 22b.

While the operation of the first and second preferred embodiments do not differ so significantly from the operation of a DDS that explanation is necessary, and the operation of the third preferred embodiment should also be evident to those skilled in the art, the detailed operation of the third embodiment will now be described.

Although not necessary, it is convenient to run both phase accumulators, A and B, off the same input clock, $f_c$, as noted above. The phase accumulators' outputs $P_a$ and $P_b$, are preferably governed by a modulus $2^j$ accumulation process, in a manner similar to that disclosed in the above referenced, commonly assigned application, incorporated by reference above, with phase increments of $N_a$ and $N_b$, respectively. Thus, outputs $P_a$ and $P_b$ are given by the equations:

$$P_{a(n)} = MOD2^j[P_{a(n-1)} + N_a] \qquad (1)$$

$$P_{b(n)} = MOD2^j[P_{b(n-1)} + N_b] \qquad (2)$$

Where:

$P_{a(n)}$ and $P_{b(n)}$ are the phase outputs of the two accumulators.

j is the width in bits of the two phase accumulators.

$N_a$ and $N_b$ are the two input phase increments: $0 \neq N \neq 2^j$

Assuming the table contains a sinusoidal single wave sequence, the approximate, that is, ignoring amplitude resolution) output from the two wave table latches, representing the numeric magnitude of the two generated waves:

$$A_{a(n)} = \sin(P_{a(n-1)}\pi/2^{j-1}) \quad (3)$$

$$A_{b(n)} = \sin(P_{b(n-1)}\pi/2^{j-1}) \quad (4)$$

The instantaneous output of the adder is the delayed sum of these two values:

$$M_{(n)} = A_{a(n-1)} + A_{b(n-1)} \quad (5)$$

$$M_{(n)} = \sin(P_{a(n-2)}\pi/2^{j-1}) + \sin(P_{b(n-2)}\pi/2^{j-1})$$

From the above expressions it can be observed that the digital output value of the system is the addition of two sine waves. Each sine wave is represented by the instantaneous phase values $P_a$ and $P_b$. Since each of these two phases accumulate at a rate proportional to the clock rate and the phase increment (N) specified for each respective phase accumulator, the two frequencies are independent.

In summary, the relative properties and advantages of the first, second and third preferred embodiments of the invention, relative to a single DDS, are summarized in the following table.

|  | FIG. #1 | FIG. #2 | FIG. #3 | FIG. #4 |
|---|---|---|---|---|
| Number of D/A's | 1 | 2 | 1 | 1 |
| Analog Adder | NO | YES | NO | NO |
| Independent freq. control | NO | YES | YES | YES |
| Spurs | LOW Under limited conditions | VERY LOW | LOW | LOW |
| # of Tables | 1 | 2 | 2 | 1 |
| normalized table speed | 1 | 1 | 1 | 2 |
| normalize table size | 1 | 1 | ½ | ½ |
| Logic Chip # of pins | LOW | HIGH | HIGH | LOW |
| Logic IC complexity | LOW | MED. | MED. | HIGH |

Thus, in the above, detailed disclosure of the invention, those skilled in the art have been enabled to make and use several arrangements for economically providing dual-tone waveform generation consistent with the retention of all advantages of direct digital waveform synthesis techniques; the relative properties and economies being summarized above and which dual-tone waveform generators are not subject to the recognized drawbacks of the analog, digital record/playback and computational techniques summarized as the background of this invention.

While the invention has particularly been described with respect to three particular preferred embodiments, it should be understood that combinations of the various embodiments, such as a combination including, for example, arrangements according to each of FIGS. 3 and 4, combined by a final analog adder or adder circuit in the fashion of FIG. 2 may be useful in certain circumstances and are considered to be within the spirit and scope of the present invention. Similarly, many variations of the present invention, as exemplified by the above disclosed particularly preferred embodiments will be apparent to those skilled in the art in light of the above detailed disclosure. Accordingly, it is to be understood that the above descriptions are given by way of example and not of limitation and that the scope of the invention is to be limited only by the scope of the following appended claims.

What I claim as my invention is:

1. A plural-tone direct digital synthesizer comprising in combination:
   at least one phase accumulator means receiving a clock signal input and phase increment input for producing a sequence of phase information signals,
   at least one phase-to-amplitude converter means for producing a sequence of amplitude signals in response to said sequence of phase information signals, and
   means for combining an output of an additional one of a phase accumulator means and a phase-to-amplitude converter means with the output of at least one of said at least one phase accumulator means and said at least one phase-to-amplitude converter means.

2. A plural-tone direct digital synthesizer as recited in claim 1, wherein said phase-to-amplitude converter means provide a digital output.

3. A plural-tone direct digital synthesizer, as recited in claim 2 further including digital-to-analog converter means for producing an analog waveform from said digital output of said phase-to-amplitude converter means.

4. A plural-tone direct digital synthesizer having at least first and second waveform generator circuits, at least one of said first and second waveform generator circuits receiving a clock frequency input and wherein said at least one of said first and second waveform generators comprises,
   a phase accumulator means having a phase increment input and receiving a respective clock frequency signal,
   a phase to amplitude conversion means, receiving the output of said phase accumulator means generating an output signal in response thereto,
   a latch means for storing the output of said phase to amplitude conversion means in response to one said clock frequency signal, and
   a digital to analog conversion means,
   said plural-tone waveform generator further including analog adder means receiving the outputs of at least said first and second waveform generators and outputting at least a signal containing at least the spectral components contained in the waveforms produced by said first and second waveform generators.

5. A plural-tone direct digital synthesizer having at least first and second waveform generator circuits, each receiving a clock frequency signal input wherein each of said first and second waveform generators comprises:
   a phase accumulator means having a phase increment input and receiving one said clock frequency,
   a phase to amplitude conversion means, receiving phase information from said phase accumulator means,
   a latch means for storing the output of said phase to amplitude conversion means in response to said clock frequency signal,
   said plural-tone waveform generator further including a digital adder means for adding the outputs of said phase to amplitude conversion means through said latches, a further latch receiving said clock frequency for storing the output of said digital adder and digital to analog conversion means for outputting a signal containing at least the spectral components contained in the waveforms produced by said first and second waveform generators in response to the output of said digital adder means.

6. A plural-tone digital waveform generators having a controller receiving a clock frequency signal and connected to first and second phase accumulators, each having a phase increment input, a multiplexer means for receiving the outputs of said first and second phase accumulators and outputting a respective output of one of said first and second phase accumulators in response to an output of said controller, a phase to amplitude conversion means receiving the output of said multiplexer means and producing a digital output, storage means for storing a digital output of said phase to amplitude conversion means corresponding to each of said first and second phase accumulators, digital adder means for adding the digital outputs stored by said storage means and digital to analog conversion means for outputting a signal containing at least the spectral components contained in the waveforms produced by said first and second waveform generators in response to the output of said digital adder means.

7. In a direct digital waveform synthesizer having at least one phase to amplitude conversion means and digital to analog conversion means, the improvement comprising:

phase accumulation means including plural phase accumulators for independently addressing said at least one phase to amplitude conversion means and means for combining signals representing the respective outputs of said phase to amplitude conversion means produced in response to respective phase accumulators.

8. In a direct digital synthesizer having a first phase accumulator, a phase to amplitude conversion means and an analog to digital converter, the improvement comprising:

a second phase accumulator for accessing at least one of said phase to amplitude conversion means and another phase to amplitude conversion means and signal combining means for combining at least one of the output of said second phase accumulator with the output of said first phase accumulator and the output of said another phase to amplitude conversion means with the output of said phase to amplitude conversion means whereby the capacity of said phase to amplitude conversion means can be solely determined by the desired phase resolution when said direct digital synthesizer is used to produce a waveform with two frequency components.

* * * * *